(12) United States Patent
Cheng

(10) Patent No.: US 11,630,540 B2
(45) Date of Patent: *Apr. 18, 2023

(54) ANALOG FRONT END CIRCUIT WITH NOISE CANCELLATION

(71) Applicant: Novatek Microelectronics Corp., Hsinchu (TW)

(72) Inventor: Yen-Cheng Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,856

(22) Filed: Feb. 22, 2022

(65) Prior Publication Data

US 2022/0179511 A1    Jun. 9, 2022

Related U.S. Application Data

(63) Continuation of application No. 17/126,049, filed on Dec. 18, 2020, now Pat. No. 11,287,931.

(60) Provisional application No. 62/950,893, filed on Dec. 19, 2019.

(51) Int. Cl.
*G06F 3/044* (2006.01)
*H04B 1/04* (2006.01)
*G06F 3/041* (2006.01)

(52) U.S. Cl.
CPC ............ *G06F 3/044* (2013.01); *G06F 3/0412* (2013.01); *G06F 3/04182* (2019.05); *H04B 1/0475* (2013.01)

(58) Field of Classification Search
CPC ........... H01L 27/323; G06F 3/041–047; G06F 2203/041–04114
See application file for complete search history.

(56) References Cited

U.S. PATENT DOCUMENTS

2015/0185927 A1*  7/2015  Inoue .................... G06F 3/0446
345/174
2019/0278396 A1*  9/2019  Shepelev ............ G06F 3/04166

* cited by examiner

*Primary Examiner* — Sanjiv D. Patel
(74) *Attorney, Agent, or Firm* — JCIPRNET

(57) ABSTRACT

The disclosure includes a touch display apparatus having AFE circuit that performs a noise cancellation of an AFE channel by utilizing noise signal received by a neighboring AFE channels. The first AFE channel includes a first integrator having an input terminal coupled to the first terminal receiving a first sensing signal. The second AFE channel includes an input amplifier. The second AFE channel is coupled between the input terminal of the first integrator in the first AFE channel and a second terminal connected to the touch panel. The second AFE channel is configured to generate a reversal input signal based on a second sensing signal received by the second terminal and couple the reversal input signal to a common node between the first integrator and the first terminal.

34 Claims, 5 Drawing Sheets

ANALOG FRONT END CIRCUIT WITH NOISE CANCELLATION

CROSS-REFERENCE TO RELATED APPLICATION

This application is a continuation application of and claims the priority benefit of a prior application Ser. No. 17/126,049 filed on Dec. 18, 2020, which claims the priority benefit of U.S. provisional application Ser. No. 62/950,893, filed on Dec. 19, 2019. The entirety of the above-mentioned patent applications is hereby incorporated by reference herein and made a part of this specification.

BACKGROUND

Technical Field

The disclosure generally relates to a touch panel, and more specifically, to a touch panel with an analog front-end circuit having a noise cancellation that reduce the influence of environmental noise.

Description of Related Art

In a touch panel, an analog front-end (AFE) circuit is an interface between the touch sensors disposed on a display and a back-end circuit that processes touch sensing signals generated by the touch sensors for touch detection. However, there are noises from various sources such as static, display panel, power supply, other circuits disposed in the touch panel, other objects near the touch panel, or any other undesired voltage or current. These noises affect the touch sensing and the output dynamic range of the AFE circuit. For example, voltage or current representing electrical noise may be input into the AFE circuit as a touch sensing signal, which may be stored in a capacitor with in the signal path such as a capacitor in the integrator. The energy of the noise would affect the output of the AFE circuit. That is, the output of the AFE circuit would carry the energy representing the electrical noise that is stored in the capacitor and reduce the output dynamic range (a ratio between the largest and smallest outputs the integrator may output) of the integrator of the AFE circuit. In addition, the stored energy of the noise may also be mistakenly processed as a touch event occurred on the touch panel.

SUMMARY

In the disclosure, an analog front-end (AFE) circuit is coupled to a touch panel. The AFE circuit includes a first AFE channel and a noise reference circuit. The first AFE channel is coupled to a first terminal connected to the touch panel, and configured to process a first sensing signal received by the first terminal. The first AFE channel includes a first integrator which has an input terminal coupled to the first terminal. The noise reference circuit is coupled between the input terminal of the first integrator in the first AFE channel and a second terminal connected to the touch panel, and configured to reverse a second sensing signal received from the second terminal, and couple the reversed second sensing signal to a common node between the first integrator and the first terminal.

In the disclosure a touch display apparatus includes a touch panel and a touch display driving circuit. The touch panel includes a plurality of electrodes, which are used as common electrodes in display periods and as a plurality of touch sensors in touch periods. The touch display driving circuit includes a touch analog front-end (AFE) circuit, which includes a plurality of AFE channels. Each the plurality of AFE channels receives an input signal through a terminal of the touch display driving circuit coupled to a corresponding touch sensor of the plurality of touch sensors. Each of the plurality of AFE channels includes a first AFE channel and a second AFE channel. The first AFE channel includes a first integrator having an input terminal coupled to the first terminal receiving a first sensing signal. The second AFE channel includes an input amplifier. The second AFE channel is coupled between the input terminal of the first integrator in the first AFE channel and a second terminal connected to the touch panel. The second AFE channel is configured to generate a reversal input signal based on a second sensing signal received by the second terminal and couple the reversal input signal to a common node between the first integrator and the first terminal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
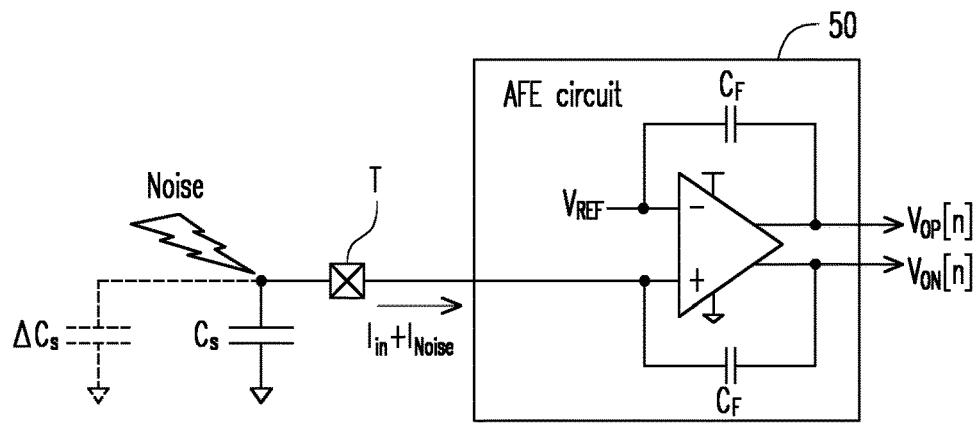
FIG. 1 is a diagram illustrating an AFE circuit that receives touch sensing signal.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram illustrating an AFE circuit 50 that receives a touch sensing signal from a touch panel including a plurality of touch sensors. The AFE circuit 50 may present a part of circuitry of an AFE channel, and a touch control integrated circuit (IC) may include a plurality of AFE channels. In FIG. 1, a distributed capacitance Cs may be referred to as a background capacitance which couples to a touch sensor on a touch panel. A capacitance ΔCs to ground is formed when a touch object such as a finger or a stylus or any other desired (expected) when the touch object touches or approaches the touch panel. The AFE circuit 50 receives the touch sensing signal from a touch sensor via the sensing terminal T, processes (such as amplifying, scaling, etc.) the input signal and generates output signals. The output signals (may be referred to as a voltage or a current) generated by the AFE circuit 50 may be transmitted to a back-end processing circuit, processor (e.g., DSP) or a controller (not shown) to determine whether a touch event occurs. The touch sensor and a signal path from the touch sensor to the sensing terminal T of the AFE circuit 50 may be affected by environmental noise. The AFE circuit 50 would also sense the noise as a current INoise which would be stored in a capacitor $C_F$ of an integrator in the AFE circuit 50. This influence of the noise would affect the output dynamic range of the AFE circuit, since the output of the AFE circuit would also carries the noise each time the AFE outputs an input signal.

In the disclosure, an AFE circuit is designed to cancel environmental noises by utilizing neighboring AFE channels, so as to improve the influence of the noises on the output dynamic range of the AFE circuit. The AFE channels may be coupled to a region of touch sensors, where the touch sensors of that region may be disposed within a proximity or having routing traces that are within proximity. The touch sensor or the routing traces of the touch sensors may be exposed to various sources that emit noises (e.g., power circuitry, static, or other electromagnetic signals). These touch sensors within the proximity would also be exposed to the same noise, and therefore, the noises may be eliminated or reduced by utilizing the neighboring AFE channels that receive signals from the touch sensors disposed in the same vicinity. The embodiments of the disclosure utilize the noise being received (or detected) by the neighboring AFE channels to perform a noise cancellation that eliminate or reduce the influence of the noise.

Figure 2:
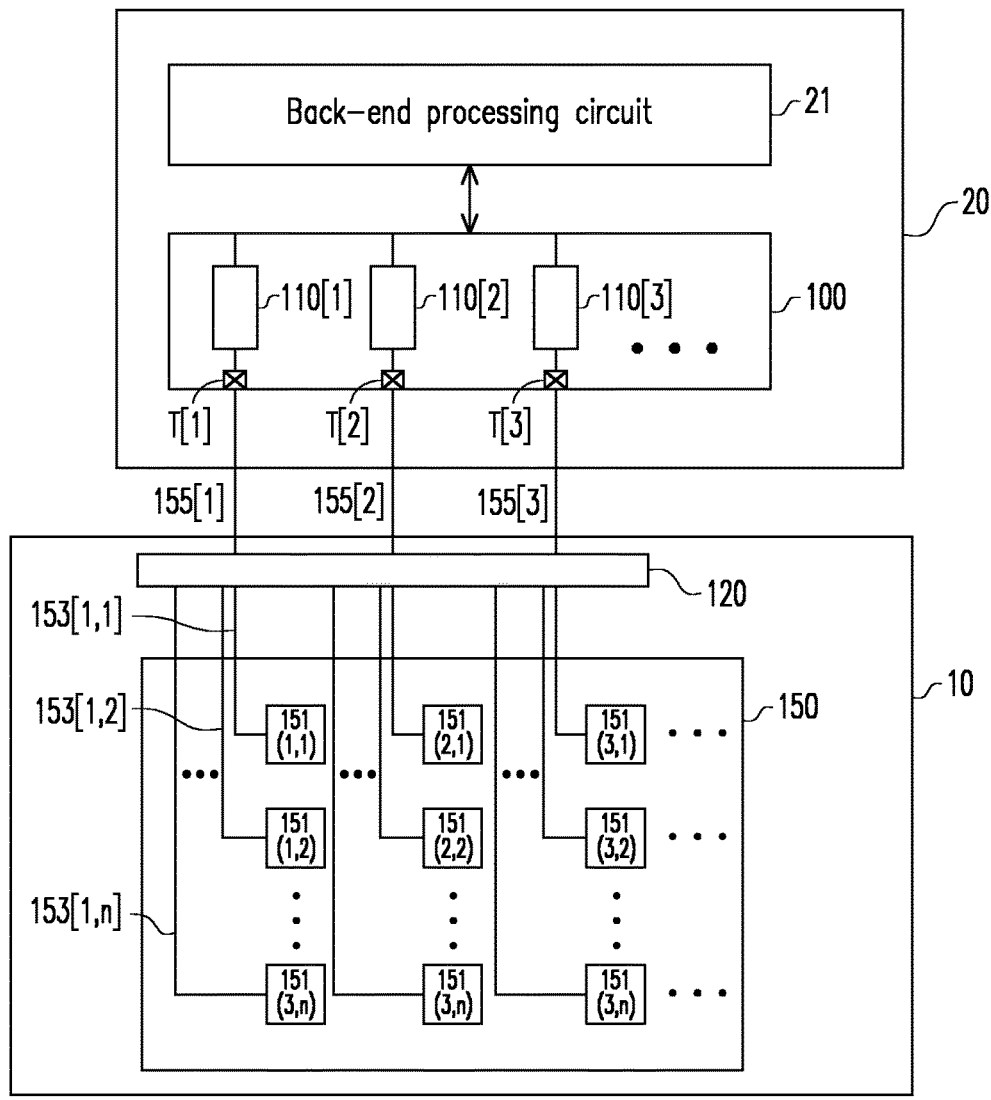
FIG. 2 is a block diagram illustrating an electronic device according to one of the embodiments of the disclosure.

FIG. 2 is a block diagram illustrating an electronic device 1 according to one of the embodiments of the disclosure. The electronic device 1 includes a touch screen 10 and a touch control circuit 20 coupled to the touch screen 10. The electronic device 1 may be any mobile devices such as mobile phone, tablet computer, smart watch, or any computer devices that has display and touch sensing functions. The touch screen 10 includes a display portion that display image frames, such as a graphical user interface (GUI) for an operating system or an application interface, still images, or video content, and a touch sensing portion that detects touch events corresponding to the displayed image frames. The display portion of the touch screen 10 may be a self-emissive display, such as an organic light emitting diodes (OLED) display, or may be a liquid crystal display (LCD) illuminated by a backlight. The touch screen 10 allows users to interact with a user interface of the electronic device 1.

The touch control circuit 20 includes an AFE circuit 100 and a back-end processing circuit 101. The AFE circuit 100 includes a plurality of AFE channels 110[1]-110[n] and a plurality of sensing terminals T[1]-T[n], and each sensing terminal is coupled to a corresponding AFE channel for receiving an input signal from a sensing line in the touch panel. The back-end processing circuit 101 may include a processor, a memory and any suitable data processing circuitry (a processor, a combination of analog and digital circuits) to perform various operations, such as one or more microprocessors, digital signal processor (DSP) one or more application specific processors (ASICs), or one or more programmable logic devices (PLDs). In some cases, the back-end processing circuit 101 may be implemented by digital circuitry to realize one or more algorithms. In some other cases, the back-end processing circuit 101 may execute programs or instructions (e.g., an operating system or application program) stored on a suitable article of manufacture, such as the local memory and/or the main memory storage device (not shown). In addition to instructions for the processor, the local memory and/or the main memory storage device may also store data to be processed by the back-end processing circuit. For example, the local memory may include random access memory (RAM) and the main memory storage device may include read only memory (ROM), rewritable non-volatile memory such as flash memory, or the like.

The touch screen 10 includes a select circuit 120 and a touch panel 150. The touch panel 150 includes a plurality of sensing lines 153[1]-153[K] (i.e., 153[1, 1] thru 153[m, n]) and a plurality of touch sensors 151 arranged in an array having M columns and N rows, where N and M are positive integers and K equals M by N. Each of touch sensors 151 may be coupled to one of sensing lines 153[1]-153[K]. Since the number of the plurality of AFE channels 110[1]-110[n] are limited, the plurality of sensing lines 153[1]-153[K] are not simultaneously but time-divisionally connected to the touch control circuit 20 through select circuits. With reference to FIG. 2, the select circuit 120 is coupled to the touch sensor 151[1, 1] thru 151[3, n]. Other touch sensors 151[4, 1] thru 151[m, n] may be coupled to the same select circuit 120 or other select circuits. The embodiments are not intended to limit the connections between touch sensors and the AFE circuit. For example, the touch sensors may be grouped, and each group may be coupled to the same select circuit. As illustrated in FIG. 2, the touch sensors disposed in the first set of columns may be coupled to the same select circuit. The touch sensors disposed in a second set of columns (first three columns) subsequent to the first set of columns may be coupled to another select circuit, where the other select circuit is coupled to the terminals T[n] of the AFE circuit 100. The select circuits are configured to select sensing lines to activate at different timing. Furthermore, each select circuit is configured to receive touch sensing signals from different touch sensors. For example, the select circuit 120 selectively transmits signals from the touch sensor 151[1, 1] thru 151[3, n] to the terminals T[1]-T[3] of the AFE circuit 100 via signal lines 155[1]-155[n]. In a first timing, the select circuit 120 is configured to transmit touch sensing signals from the touch sensors 153[1, 1] thru 153[1, n] to the terminals T[1]-T[n] of the AFE circuit 100. In a second timing, the select circuit 120 is configured to transmit touch sensing signals of the touch sensors 153[2, 1] thru 153[2, n] to the terminals T[1]-T[n] of the AFE circuit 100. In a third timing, the select circuit 120 is configured to transmit touch sensing signals of the touch sensors 153[3, 1] thru 153[3, n] to the terminals T[1]-T[n] of the AFE circuit 100. In other embodiments, depending on the size of the display panel, the touch sensors each column may be grouped into sub-groups, and the select circuit 120 is configured to transmit touch sensing signals of the touch sensors of each sub-group at different timing.

Figure 3:
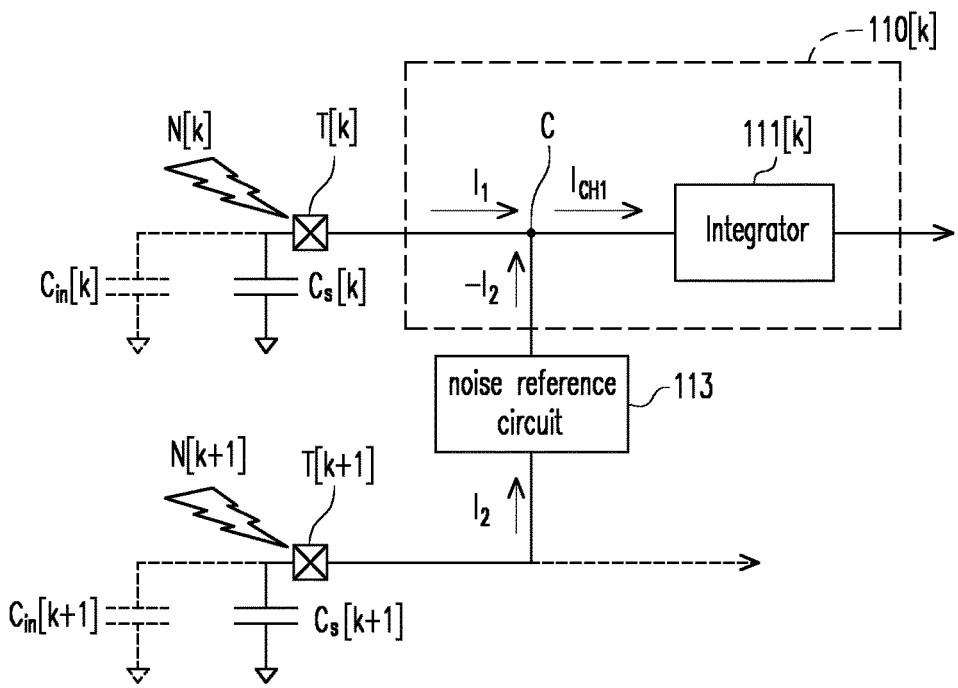
FIG. 3 is a diagram illustrating an AFE channel of the AFE circuit according to one of the embodiments of the disclosure.

FIG. 3 is a diagram illustrating an AFE channel of the AFE circuit according to one of the embodiments of the disclosure. In the embodiment, the illustrated AFE channel would be referred to as a first AFE channel 110[*k*], which receives a first sensing signal regarding to an input capacitance Cin[k] which is formed when a touch object is in proximity to the corresponding touch sensor and also receives a noise signal through a first terminal T[k], where k is greater than 0 and less than N. FIG. 3 also illustrates a second AFE channel which receives a noise through a second terminal T[k+1]. The second sensing terminal T[k+1] may be immediately adjacent to the first sensing terminal T[k], and touch sensors coupled to the first and second terminals T[k] and T[k+1] may also be neighboring. However, the disclosure is not limited thereto. The first and second sensing terminals T[k], T[k+1] may be separated by other sensing terminals. In the embodiment, a first sensing signal path is from the first sensing terminal T[k] to an integrator circuit of the first AFE channel 110[*k*], and a second sensing signal path is from the second sensing terminal T[k+1] to an integrator circuit of the second AFE channel 110[*k*+1], where the second sensing signal path is coupled to the first sensing signal path at a coupling node C in the first sensing signal path. The input capacitance Cin[k] coupled to the first sensing terminal T[k] are brought by a touch object such as a finger or a stylus in proximity to the touch panel. The noise affects not only the first sensing signal received by the first sensing terminal T[k] but also a second sensing signal received by the second sensing terminal T[k+1]. That is, a first signal I1 propagating on the first sensing signal path and a second signal I2 propagating on the second sensing signal path may include almost same or similar noise component (e.g., I1=I1$_{signal}$+I1$_{noise}$; I2=I2$_{signal}$+I2$_{noise}$; and I1$_{noise}$=I2$_{noise}$.) The embodiment performs the noise cancellation by utilizing this characteristic of receiving the same or similar environmental noise on the first and second sensing terminals T[1], T[k+1] of the AFE circuit 100. For example, the second signal I2 of the second sensing signal path is coupled to the first sensing signal path at the common node C. In the embodiment, a noise reference circuit 113 may be disposed between the first sensing signal path and the second sensing signal path. The noise reference circuit 113 with respect to an AFE channel may be a part of circuitry of an adjacent AFE channel (which means the sensing terminals of the two AFE channels are close). The noise reference circuit 113 may be implemented by an inverter circuit or any other suitable circuits that reverse the polarity of the second sensing signal received by the second terminal. The noise reference circuit 113 would couple the second signal I2 on the second sensing signal path to the first sensing signal path and configured to reverse the second signal I2 (i.e., changing the direction of the second signal I2 to an opposite direction). The coupling relationship between the first and second sensing signal paths would enable the first AFE channel 110[*k*] to cancel the noise component I$_{noise}$ generated by the electrical noise from the first signal I1 on the first sensing signal path by using the noise received from the second terminal T[k+1]. As a result, the energy of the noise signal may be eliminated before entering the integrator, and thus the prevents the energy of the noise signal to be stored in the capacitor C$_F$ of the integrator as illustrated in FIG. 1. In addition, in the occurrence of a touch event, a touch signal component Iin (i.e., I1$_{signal}$-I2$_{signal}$) would remain with a reduced noise signal, since the noise component INoise may be removed by utilizing a reversed sensing signal including noise from the second AFE channel. Accordingly, the influence of electrical noise signal may be reduced. Without the noise component, the output dynamic range (i.e., voltage resolution) of the AFE circuit output is improved.

As mentioned above, the energy of the noise may be stored in a capacitor C$_F$ of the integrator 111[*k*], which affects the output dynamic range of the first AFE channel 110[*k*]. In the embodiment, with or without the input capacitance Cin generated by the touch object, the configuration of coupling the second AFE channel 110[*k*+1] to the first AFE channel 110[*k*] would cancel the noise received at the first terminal T[k]. In other words, the configuration prevents the energy of the noise signal to be stored in the capacitor of the integrator 111[*k*].

Figure 4:
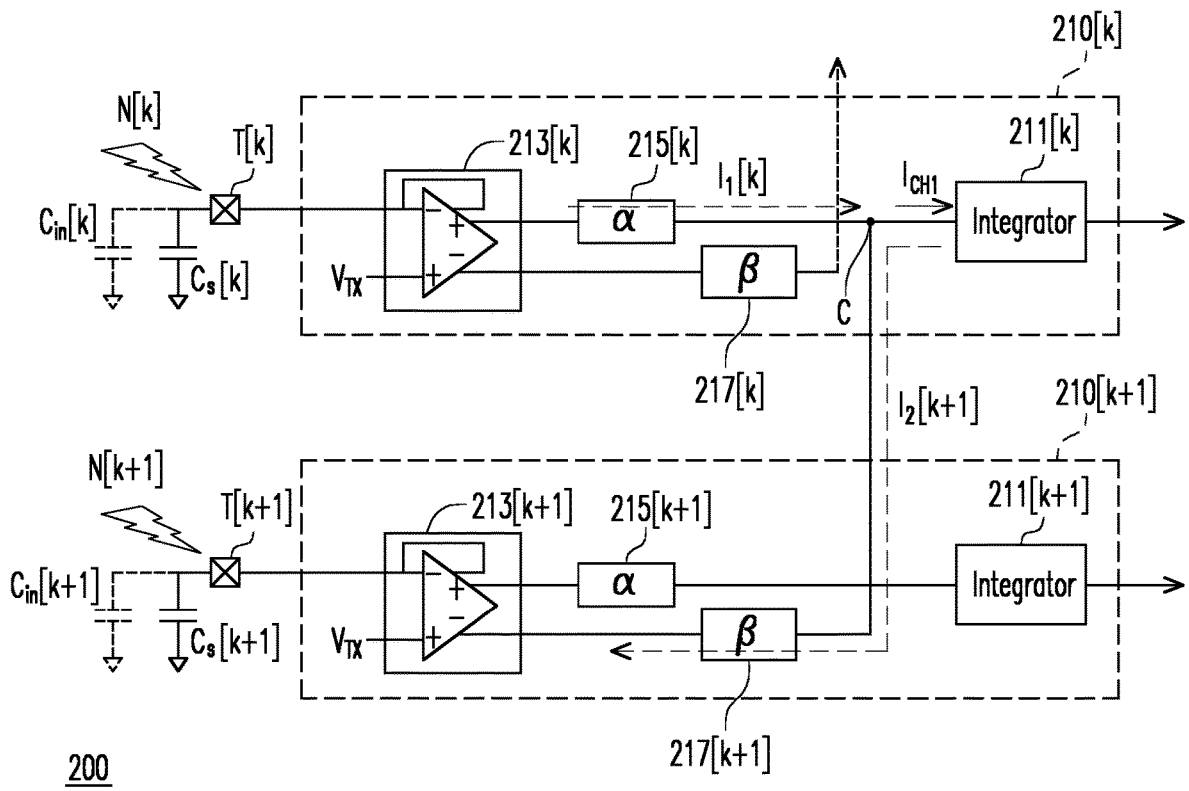
FIG. 4 is a diagram illustrating an AFE circuit according to one of the embodiments of the disclosure.

FIG. 4 is a diagram illustrating an AFE circuit according to one of the embodiments of the disclosure. With reference to FIG. 4, the AFE 200 includes a first terminal T[k], a second terminal T[k+1], a first AFE channel 210[*k*] coupled to the first terminal T[k], and a second AFE channel 210[*k*+1] coupled to the second terminal T[k+1]. The first and second sensing terminals T[k], T[k+1] may be immediately adjacent to each other. Further, the touch sensors coupled to the first and second terminals T[1] and T[2] may be within the same vicinity on the touch panel 150. However, the disclosure is not limited thereto. In other embodiments, the first and second terminals T[k], T[k+1] may be separated by other terminals, and the touch sensors coupled to the first and second terminals T[k], T[k+1] may or may not be immediately adjacent to each other.

In the embodiments, each of the first and second AFE channels 210[*k*], 210[*k*+1] includes an input amplifier 213[*k*], 213[*k*+1], current conveyors 215[*k*], 217[*k*], 215[*k*+1], 217[*k*+1], and an integrator 211[*k*], 211[*k*+1] for processing a sensing signal received from the corresponding terminal. The input amplifier 213[*k*], 213[*k*+1] may be a differential amplifier having unity gain. Each of the input amplifier 213[*k*], 213[*k*+1] includes an inverting input terminal, a non-inverting input terminal, a first output terminal, and a second output terminal. The inverting input terminal is coupled to the corresponding terminal of the AFE circuit to receive a sensing signal received by the corresponding terminal, and the non-inverting input terminal is coupled to a touch driving signal (VTX). The touch driving signal Vtx may be a periodic square wave signal generated by a voltage regulator circuit (not shown) in the touch control circuit 20, or may be generated by switching between a high voltage and a low voltage which define the high level and the lower level of the touch driving signal Vtx. The touch driving signal is provided to the touch sensors to be sensed by the feedback loop of the input amplifier 213. The first output terminal of the input amplifier 213 is configured to output an input signal, while the second output terminal of the input amplifier is configured to output a reversal input signal having the same magnitude but opposite polarity with respect to the input signal. The inverting input terminal of the input amplifier may also be coupled to the first output terminal as a feedback loop. The first output terminal is coupled to a first current conveyor having a first multiplier (denoted by α), or referred to as a first scale factor, that scales the input signal. The second output terminal is coupled to second current conveyor having a second multiplier (denoted by β) that scales the reversal input signal. The first current conveyor then outputs a scaled input signal to the integrator. The second current conveyor outputs the scaled reversal input signal to other AFE channels for noise cancellation in the other AFE channels.

With reference to the first AFE channel 210[*k*] as illustrated in FIG. 4, the inverting input terminal of the input amplifier 213[*k*] is coupled to the first terminal T[k] which receives a first sensing signal. The non-inverting input terminal of the input amplifier 213[*k*] is coupled to the touch driving signal VTX. The input amplifier 213[$k$] outputs the first input signal I1[$k$] to the first current conveyor 215[$k$] through the first output terminal and the first reversal input signal to the second current conveyor 217[$k$] through the second output terminal based on the first sensing signal. The first current conveyor 215[$k$] has a multiplier denoted by $\alpha$ that scales the first input signal I1[$k$] and configured to output the scaled first input signal I1[$k$] to the integrator 211[$k$]. The second current conveyor 217[$k$] has a multiplier denoted by I1[$k$] that scales the first reversal input signal I2[$k$] and configured to output the scaled second input signal I2[$k$] to other AFE channels. In the embodiment, the second AFE channel 210[$k$+1] is coupled to the first AFE channel 210[$k$] at a node C between the first current conveyor 215[$k$] and the integrator 211[$k$]. The input amplifier 213[$k$+1] and the second current conveyor 217[$k$+1] of the second AFE channel 210[$k$+1] form a noise reference circuit with respect to the first AFE channel 210[$k$]. In detail, the second AFE channel 210[$k$+1] receives the noise signal N[k+1] through the second terminal T[k+1] as a second sensing signal. The input amplifier 213[$k$+1] of the second AFE channel 210[$k$+1] outputs a second input signal I1[$k$+1] and a second reversal input signal I2[$k$+1] based on the second sensing signal (which includes the noise signal N[k+1].) Then, the second input signal and the second reversal signal I1[$k$+1], I2[$k$+1] are respectively transmitted to the first and second current conveyors 215[$k$+1], 217[$k$+1] (may also be referred to as a third current conveyor and a fourth current conveyor) for scaling. The scaled second input signal I1[$k$+1] would be transmitted to the integrator 211[$k$+1] as a channel input signal received by the second AFE channel 210[$k$+1]. On the other hand, the scaled second reversal input signal I2[$k$+1] is coupled to the node C in the first AFE channel 210[$k$]. Since the noise signal N[k+1] received by the second AFE channel 210[$k$+1] would be similar to the noise signal N[k] received by the first AFE channel 210[$k$], the second reversal input signal I2[$k$+1] may be a signal that represents the noise component of the first input signal I1[$k$] of the first AFE channel 210[$k$] in an opposite polarity. Accordingly, the coupling of the second reversal input signal I2[$k$+1] of the second AFE channel 210[$k$+1] may be utilized to cancel the influence of the noise signal N[k] received by the first terminal T[k] in the first AFE channel 210[$k$]. The first channel input signal ICH1 of the first AFE channel 210[$k$] is a result of combining the first input signal I1[$k$] and the second reversal input signal I2[$k$+1] of the second AFE channel 210[$k$+1]. That is, the input signal of the first AFE channel may be calculated as follows: ICH1=$\alpha$I1[$k$]+$\beta$I2[$k$+1].

In the embodiment, the current conveyors 215[$k$], 215[$k$+1], 217[$k$], 217[$k$+1] of the first and second AFE channels 210[$k$], 210[$k$+1] may be utilized as parameters that enables adjustments on the scaling of the respective input signal. The multiplier (i.e., $\alpha$, $\beta$) of the current conveyors may be configured to fine tune the noise cancellation of each AFE channel. For example, the multiplier $\beta$ of the second current conveyor that scales the reversal input signal may be configured to scale down the reversal input signal that is to be transmitted to other AFE channels to match the noise component received in the other AFE channels, so that the touch input signal from the touch sensor may be preserved. The multiplier of the current conveyors between the AFE channels may be the same or different. In some embodiments, the multipliers of each AFE channel may be configured respectively to be different. In some other embodiments, the first current conveyor 215 may be omitted in all or some of the AFE channel 210, which pass the first input signal I1 without scaling. The input signal of the AFE channel without the first current conveyor 215 would then be ICH1=I1[$k$]+$\beta$I2[$k$+1]. In the embodiments, the multipliers $\alpha$, $\beta$ are positive integers that are designed to remove the noise signal without eliminating the touch sensing signal of the AFE channel. In the embodiments, the multiplier $\alpha$ is greater than the multiplier $\beta$. For example, the multipliers $\alpha$, $\beta$ may be 2 and 1, respectively. In other words, the first input signal I1[$k$] propagating on the first AFE channel 210[$k$] may be scaled by multiplier $\alpha$, i.e., 2, while the second input signal I2[$k$+1] propagating on the second AFE channel 210[$k$+1] may be scaled by multiplier $\beta$, i.e., 1. Accordingly, the noise signal N[k+1] may be subtracted from the touch sensing signal I1[$k$] without eliminating the touch sensing signal received from the terminal T[k]. The 1 to 2 ratio between the multipliers $\alpha$, $\beta$ is used as an example. In other embodiments, the multipliers $\alpha$, $\beta$ may have any ratios for obtaining an accurate result in detecting the touch sensing signal and removing the noise signals. For example, a ratio of multiplier $\alpha$ to multiplier $\beta$ may be 3 to 1, 3 to 2, 5 to 1, or any other ratios.

Figure 5:
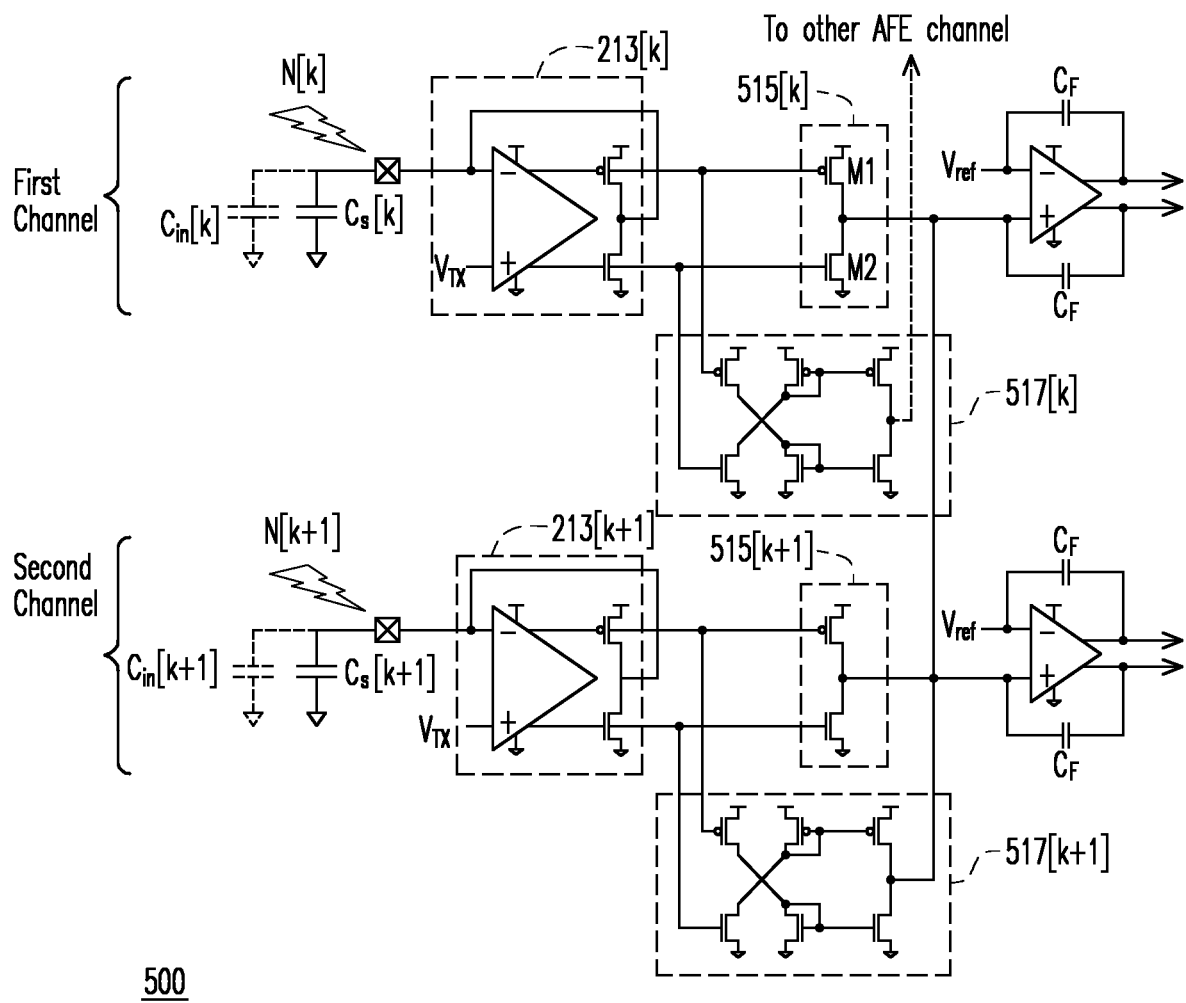
FIG. 5 is a circuit diagram of an AFE circuit 500 according to one of the embodiments of the disclosure.

FIG. 5 is a circuit diagram of an AFE circuit 500 according to one of the embodiments of the disclosure. Each component of the AFE circuit 200 is presented with circuit diagram according to one of the embodiments. The function of the input amplifiers 213[$k$], 213[$k$+1], the integrators 211[$k$], 211[$k$+1] are the same as described above. With reference to FIG. 5, the first current conveyor 515 (i.e., 515[$k$], 515[$k$+1]) of the AFE circuit 500 may be implemented with a first transistor M1 and a second transistor M2 connected in a series between a power voltage and a ground, which copies the output of the first input signal output by the input amplifier 213[$k$]. The first transistor M1 is a different type of transistor as compare to the second transistor M2. For example, the first transistor M1 may be a P-type transistor, while the second transistor M2 may be N-type transistor. In the embodiment, the first current conveyor does not scale the first input signal. However, in other embodiments, the multiplier $\alpha$ as described above may be implemented by using a current mirror. The second current conveyor 517 (i.e., 517[$k$] and 517[$k$+1]) may include a current mirror and an output circuit that scales and outputs the scaled (first/second) reversal input signal.

Figure 6:
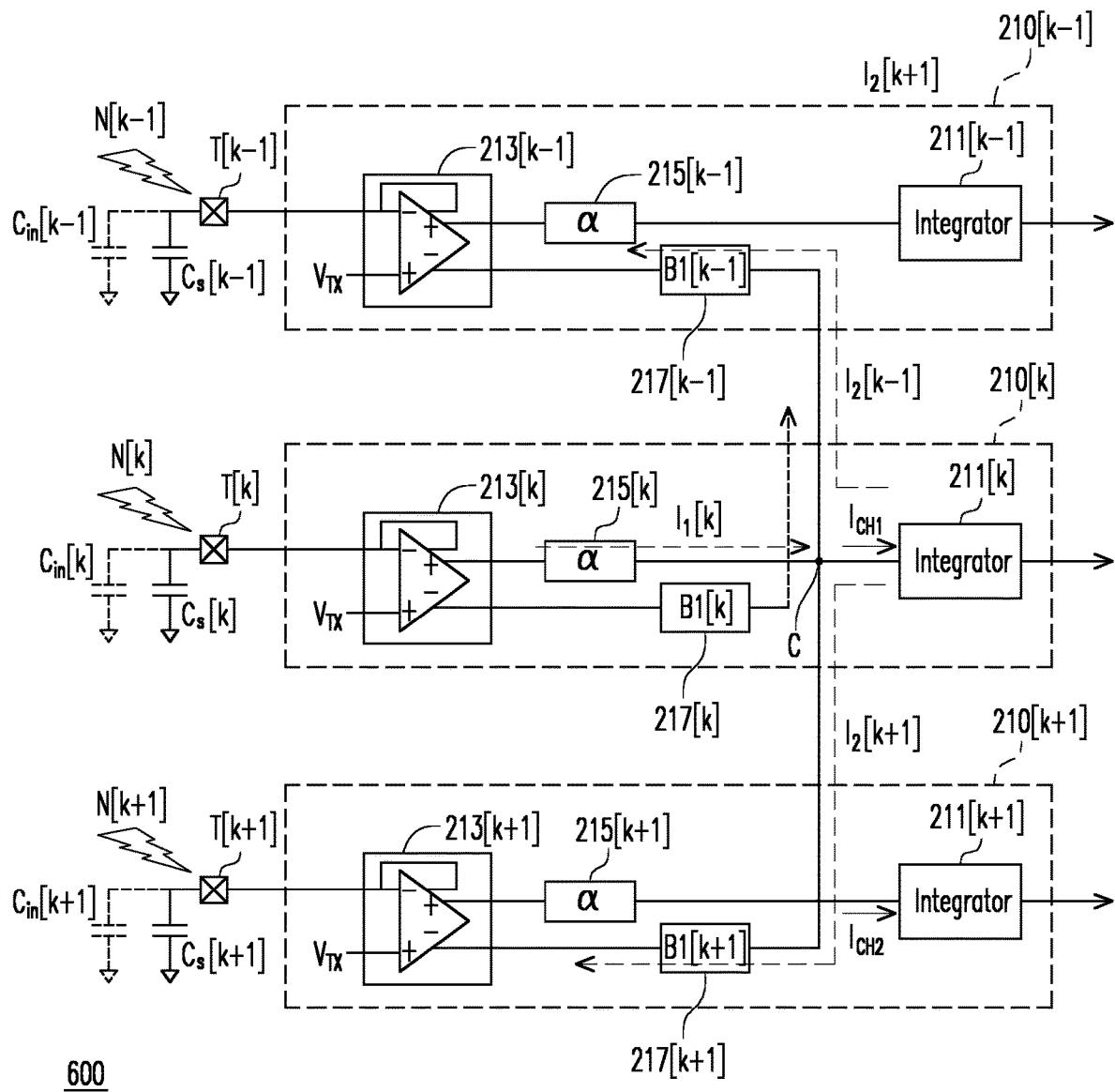
FIG. 6 is a block diagram illustrating an AFE circuit 600 according to one of embodiments of the disclosure.

FIG. 6 is a block diagram illustrating an AFE circuit 600 according to one of embodiments of the disclosure. In the embodiments, the noise cancellation of the AFE circuit 600 may be performed by utilizing the reversal input signal from a plurality of AFE channels. With reference to FIG. 6, a third AFE channel 210[$k$−1] is illustrated in addition to the first and second AFE channels 210[$k$], 210[$k$+1] as illustrated in FIG. 4. The third AFE channel 210[$k$−1] denoted by [$k$−1] may represent that the sensing terminal T[k−1] is immediately adjacent to the sensing terminal T[k] or the corresponding touch sensor connected to the sensing terminal T[k−1] is close to the touch sensor connected to the sensing terminal T[k]. However, the disclosure is not intended to limit the positional relationship between the first, second and third AFE channels. In other embodiments, the third AFE channels may be on the same side of the first AFE channel with respect to the second AFE channels. In yet other embodiments, the third AFE channel may be physically located between the first and second AFE channels.

In the embodiment, the third AFE channel 210[$k$−1] that includes an input amplifier 213[$k$−1], a first current conveyor 215[$k$−1], a second current conveyor 217[$k$−1], and an integrator 211[$k$−1]. The input amplifier 213[$k$−1] receives the noise signal N[k−1] as a third sensing signal. In an occurrence of a touch event, the input amplifier 213[k−1] would also receive a touch input signal regarding to the input capacitance Cin[k−1] in addition to the noise signal N[k−1]. In response to the receipt of the noise signal N[k−1] (or the touch input signal), the input amplifier 213[k−1] outputs a third input signal I1[k−1] to the first current conveyor 215[k] and a third reversal input signal I2[k−1] having opposite polarity with respect to the third input signal I1[k−1] to the second current conveyor 217[k−1] based on the third sensing signal. The third input signal I1[k−1] would be transmitted to the integrator 211[k−1] through the first current conveyor 215[k−1], where the third input signal I1[k−1] may or may not be scaled by the first current conveyor 215[k−1]. The third reversal input signal I2[k−1] would be coupled to the node C of the first AFE channel 210[k] (i.e., the signal path of the first input signal I1[k]) through the second current conveyor 217[k−1] for noise cancellation on the first AFE channel 210[k]. In other words, the first AFE channel 210[k] would receive two scaled reversal input signals I2[k+1], I2[k−1] for noise cancellation. That is, the channel input signal ICH1 received by the integrator 211[k] of the first AFE channel 210[k] may be obtained as follow:

$$ICH1=\alpha I1[k]-(\beta[k+1]I2[k+1]+\beta[k-1]I2[k-1]).$$

The multipliers β[k], β[k+1], β[k−1] of the second current conveyors in the first, second and third AFE channels 210[k], 210[k+1], 210[k−1] may be the same or different according to the design requirements. For example, the multipliers β[k+1], β[k−1] of second current conveyor in the second and third AFE channels 210[k+1], 210[k−1] may be predetermined to cancel the noise signal N[k] in the first AFE channel 210[k].

Figure 7:
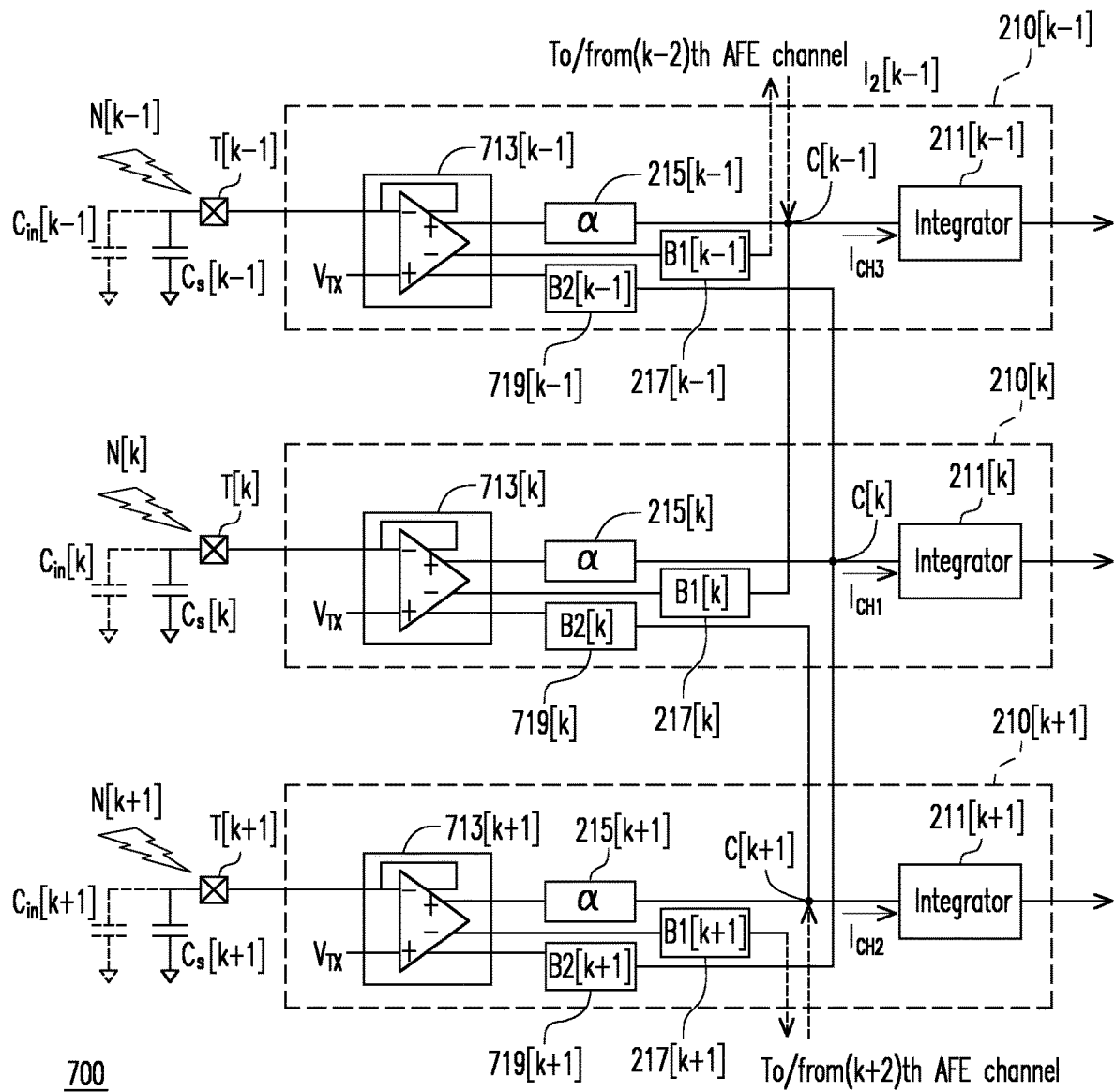
FIG. 7 is a block diagram illustrating an AFE circuit 700 according to one of the embodiments of the disclosure.

FIG. 7 is a block diagram illustrating an AFE circuit 700 according to one of the embodiments of the disclosure. In FIG. 7, the first current conveyor, the second current conveyor and the integrator of each AFE channels are similar to the embodiments illustrated in FIGS. 4 and 6. In addition to the embodiment illustrated in FIG. 6, the input amplifier of each AFE channel further outputs a plurality of reversal input signals to a plurality of second current conveyors, where the reversal input signals have the same magnitude but different polarity with respect to the input signal generated by the input amplifier. For the purpose of comprehensive and brevity, one of the second current conveyors may be referred to as a third current conveyor 719. The third current conveyor 719 may have a multiplier β2, which may be different or the same from the multiplier β1 of the second current conveyor 217. In the embodiment, each channel receives the reversal input signal (e.g., I2[k+1]) from one of the neighboring AFE channel and another reversal input signal (e.g., I2[k−1]) from another one of the neighboring AFE channel. In other words, the noise cancellation of each AFE channel may be performed by utilizing reversal input signals from two neighboring AFE channels. Furthermore, the multiplier of the second and third current conveyors that scales the reversal input signal of the corresponding AFE channels may be configured to match a portion of the noise signal received by the AFE channel that receives the reversal input signals. For example, the second reversal input signal I2[k+1] of the second AFE circuit 210[k+1] and the third reversal input signal I3[k−1] of the third AFE channel 210[k−1] are coupled to the signal path of first AFE channel 210[k] at the node C[k] for noise cancellation of the first AFE channel. The channel signal of the first, second, and third AFE channels 210[k], 210[k+1], 210[k−1] may be represented as follows:

$$ICH1=\alpha I1[k]-(\beta1[k+1]I2[k+1]+\beta[k-1]I3[k-1]).$$

$$ICH2=\alpha I1[k+1]-(\beta1[k+2]I2[k+2]+\beta[k]I3[k]).$$

$$ICH3=\alpha I1[k-1]-(\beta1[k]I2[k]+\beta2[k-2]I2[k-2]).$$

Since the touch sensors within a vicinity would experience similar environmental noise, noise cancellation may be effectively performed by utilizing the neighboring AFE channels. Based on the embodiments disclosed above, the input amplifier of the AFE circuit may be configured to output a signal having opposite polarity with respect to the signal received from the touch sensor. The signal having opposite polarity may be coupled to a neighboring AFE channel to perform noise cancellation. In a case of no touch event, the noise received by the AFE channel may be eliminate or reduced by the signal having opposite polarity. In a case where there is a touch event, the signal may be scaled by the predetermined multiplier of the current conveyor in the neighboring channel(s) and used to extract the noise component of the AFE channel. Accordingly, the output dynamic range of the AFE circuit may be improved by eliminating the influence of the noise on the capacitor, and the touch event may be accurately determined without the noise component.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An analog front-end (AFE) circuit, coupled to a touch panel, comprising:
 a first AFE channel, coupled to a first terminal connected to the touch panel, configured to process a first sensing signal received by the first terminal, and comprising:
  a first integrator, having an input terminal coupled to the first terminal;
 a second AFE channel, coupled to a second terminal connected to the touch panel, configured to process a second sensing signal received from the second terminal and generate a noise cancellation signal, and comprising:
  a second input amplifier, having an input terminal coupled to the second terminal, a first output terminal outputting a second input signal generated based on the second sensing signal, and a second output terminal outputting a second reversal input signal having a opposite polarity with respect to the second input signal; and
 a third AFE channel, coupled to a third terminal connected to the touch panel, receiving a third sensing signal, and comprising:
  a third integrator; and
  a third input amplifier, having an input terminal coupled to the third terminal, a first output terminal coupled to the third integrator, and a second output terminal coupled to the input terminal of the first integrator in the first AFE channel, and configured to output a third input signal and a third reversal input signal based on the third sensing signal received by the third terminal, wherein the third input signal has the same magnitude but opposite polarity to the third reversal input signal, wherein a partial circuit of the second AFE channel behaves as a noise reference circuit for generating the noise cancellation signal, by scaling the second reversal input signal with a second scale factor, and outputting the noise cancellation signal to a common node between the first integrator of the first AFE channel and the first terminal, wherein the third reversal input signal of the third AFE channel is coupled to the common node in the first AFE channel at which a first input signal of the first AFE channel, the second reversal input signal output by the noise reference circuit, and the third reversal input signal of the third AFE channel are summed.

2. The AFE circuit of claim 1, wherein first sensing signal includes a noise signal received by the first terminal, and the second sensing signal includes a noise signal received by the second terminal.

3. The AFE circuit of claim 2, wherein the first terminal is coupled to a first touch sensor on the touch panel, and the second terminal is coupled to a second touch sensor on the touch panel, wherein the first touch sensor and the second touch sensor are neighboring to each other.

4. The AFE circuit of claim 2, wherein the first sensing signal further includes a touch signal generated by a first touch sensor coupled to the first terminal.

5. The AFE circuit of claim 1, wherein the second AFE channel further comprises:
a second current conveyor, coupled between the second output terminal of the second input amplifier and the input terminal of the first integrator of the first AFE channel, and configured to scale the second reversal input signal of the second AFE channel with the second scale factor and output the scaled second reversal input signal as the noise cancellation signal.

6. The AFE circuit of claim 5, wherein the noise reference circuit comprises the second input amplifier and the second current conveyor of the second AFE channel.

7. The AFE circuit of claim 1, wherein the noise cancellation signal is used for removing a noise portion of the first input signal in the first AFE channel.

8. The AFE circuit of claim 1, wherein the second AFE channel further comprises a second integrator coupled to the first output terminal of the second input amplifier of the second AFE channel.

9. The AFE circuit of claim 1, wherein the noise reference circuit is coupled to the input terminal of the first integrator of the first AFE channel.

10. The AFE circuit of claim 1,
wherein the first AFE channel further comprises a first input amplifier and a first current conveyor, coupled between a first output terminal of the first input amplifier and the first integrator, and scaling the first input signal of the first AFE channel with a first scale factor.

11. The AFE circuit of claim 1, wherein the AFE circuit and a display driving circuit is implemented as a touch display driving circuit.

12. A touch display apparatus, comprising:
a touch panel, comprising a plurality of electrodes, which are used as common electrodes in display periods and as a plurality of touch sensors in touch periods; and
a touch display driving circuit comprising a touch analog front-end (AFE) circuit, including a plurality of AFE channels, wherein each the plurality of AFE channels receives a input signal through a terminal of the touch display driving circuit coupled to a corresponding touch sensor of the plurality of touch sensors, wherein each of the plurality of AFE channels comprise:
a first AFE channel, comprising:
a first integrator, having an input terminal coupled to the first terminal receiving a first sensing signal;
a second AFE channel, configured to process a second sensing signal received from the second terminal and generate a noise cancellation signal, wherein the second AFE channel comprises:
a second input amplifier, having an input terminal coupled to the second terminal, a first output terminal outputting a second input signal, and a second output terminal outputting a second reversal input signal having a opposite polarity with respect to the second input signal; and
a third AFE channel, coupled to a third terminal connected to the touch panel, receiving a third sensing signal, and comprising:
a third integrator; and
a third input amplifier, having an input terminal coupled to the third terminal, a first output terminal coupled to the third integrator, and a second output terminal coupled to the input terminal of the first integrator in the first AFE channel, and configured to output a third input signal and a third reversal input signal based on the third sensing signal received by the third terminal, wherein the third input signal has the same magnitude but opposite polarity to the third reversal input signal, wherein a partial circuit of the second AFE channel behaves as a noise reference circuit for generating the noise cancellation signal, by scaling the second reversal input signal with a second scale factor, and outputting the noise cancellation signal to a common node between the first integrator of the first AFE channel and the first terminal, wherein the third reversal input signal of the third AFE channel is coupled to the common node in the first AFE channel at which a first input signal of the first AFE channel, the second reversal input signal output by the noise reference circuit, and the third reversal input signal of the third AFE channel are summed.

13. The touch display apparatus of claim 12, wherein first sensing signal includes a noise signal received by the first terminal, and the second sensing signal includes a noise signal received by the second terminal.

14. The touch display apparatus of claim 13, wherein the first terminal is coupled to a first touch sensor of the plurality of touch sensors on the touch panel, and the second terminal is coupled to a second touch sensor of the plurality of touch sensors on the touch panel, wherein the first touch sensor and the second touch sensor are neighboring to each other.

15. The touch display apparatus of claim 13, wherein the first sensing signal further includes a touch signal generated by a first touch sensor of the plurality of touch sensors coupled to the first terminal.

16. The touch display apparatus of claim 12, wherein the second AFE channel further comprises:
a second current conveyor, coupled between the second output terminal of the second input amplifier and the input terminal of the first integrator of the first AFE channel, and configured to scale the second reversal input signal of the second AFE channel with the second scale factor and output the scaled second reversal input signal as the noise cancellation signal.

17. The touch display apparatus of claim 16, wherein the noise reference circuit comprises the second input amplifier and the second current conveyor of the second AFE channel.

18. The touch display apparatus of claim 12, wherein the noise cancellation signal is used for removing a noise portion of the first input signal in the first AFE channel.

19. The touch display apparatus of claim 12, wherein the second AFE channel further comprises a second integrator coupled to the first output terminal of the second input amplifier of the second AFE channel.

20. The touch display apparatus of claim 12, wherein the noise reference circuit is coupled to the input terminal of the first integrator of the first AFE channel.

21. The touch display apparatus of claim 12,
wherein the first AFE channel further comprises a first input amplifier and a first current conveyor, coupled between a first output terminal of the first input amplifier of the first AFE channel and the first integrator, and scaling the first input signal of the first AFE channel with a first scale factor.

22. The touch display apparatus of claim 12, wherein the AFE circuit and a display driving circuit is implemented as the touch display driving circuit.

23. An analog front-end (AFE) circuit, coupled to a touch panel, comprising:
a first AFE channel, coupled to a first terminal connected to the touch panel, configured to process a first sensing signal received by the first terminal, and comprising:
a first integrator, having an input terminal coupled to the first terminal;
a second AFE channel, coupled to a second terminal connected to the touch panel, configured to process a second sensing signal received from the second terminal and generate a noise cancellation signal, and comprising:
a second input amplifier, having an input terminal coupled to the second terminal, a first output terminal outputting a second input signal generated based on the second sensing signal, and a second output terminal outputting a second reversal input signal having a opposite polarity with respect to the second input signal,
wherein a partial circuit of the second AFE channel behaves as a noise reference circuit for generating the noise cancellation signal, by scaling the second reversal input signal with a second scale factor, and outputting the noise cancellation signal to a common node between the first integrator of the first AFE channel and the first terminal, and
the second input amplifier of the second AFE channel further comprises at least one output terminal other than the first output terminal and the second output terminal of the second input amplifier respectively coupled to at least one other neighboring AFE channel, and configured to output at least one other second reversal input signal through the at least one output terminal.

24. The AFE circuit of claim 23, wherein first sensing signal includes a noise signal received by the first terminal, and the second sensing signal includes a noise signal received by the second terminal.

25. The AFE circuit of claim 23, wherein the second AFE channel further comprises:
a second current conveyor, coupled between the second output terminal of the second input amplifier and the input terminal of the first integrator of the first AFE channel, and configured to scale the second reversal input signal of the second AFE channel with the second scale factor and output the scaled second reversal input signal as the noise cancellation signal.

26. The AFE circuit of claim 23, wherein the noise cancellation signal is used for removing a noise portion of a first input signal in the first AFE channel.

27. The AFE circuit of claim 23, wherein the second AFE channel further comprises a second integrator coupled to the first output terminal of the second input amplifier of the second AFE channel.

28. The AFE circuit of claim 23, wherein the first AFE channel further comprises a first input amplifier and a first current conveyor, coupled between a first output terminal of the first input amplifier and the first integrator, and scaling a first input signal of the first AFE channel with a first scale factor.

29. A touch display apparatus, comprising:
a touch panel, comprising a plurality of electrodes, which are used as common electrodes in display periods and as a plurality of touch sensors in touch periods; and
a touch display driving circuit comprising a touch analog front-end (AFE) circuit, including a plurality of AFE channels, wherein each the plurality of AFE channels receives a input signal through a terminal of the touch display driving circuit coupled to a corresponding touch sensor of the plurality of touch sensors, wherein each of the plurality of AFE channels comprise:
a first AFE channel, comprising:
a first integrator, having an input terminal coupled to the first terminal receiving a first sensing signal; and
a second AFE channel, configured to process a second sensing signal received from the second terminal and generate a noise cancellation signal, wherein the second AFE channel comprises:
a second input amplifier, having an input terminal coupled to the second terminal, a first output terminal outputting a second input signal, and a second output terminal outputting a second reversal input signal having a opposite polarity with respect to the second input signal,
wherein a partial circuit of the second AFE channel behaves as a noise reference circuit for generating the noise cancellation signal, by scaling the second reversal input signal with a second scale factor, and outputting the noise cancellation signal to a common node between the first integrator of the first AFE channel and the first terminal, and
the second input amplifier of the second AFE channel further comprises at least one output terminal other than the first output terminal and the second output terminal of the second input amplifier respectively coupled to at least one other neighboring AFE channel, and configured to output at least one other second reversal input signal through the second output terminal.

30. The touch display apparatus of claim 29, wherein first sensing signal includes a noise signal received by the first terminal, and the second sensing signal includes a noise signal received by the second terminal.

31. The AFE circuit of claim 29, wherein the second AFE channel further comprises:
a second current conveyor, coupled between the second output terminal of the second input amplifier and the input terminal of the first integrator of the first AFE channel, and configured to scale the second reversal input signal of the second AFE channel with the second scale factor and output the scaled second reversal input signal as the noise cancellation signal.

32. The touch display apparatus of claim 29, wherein the noise cancellation signal is used for removing a noise portion of a first input signal in the first AFE channel.

33. The touch display apparatus of claim 29, wherein the second AFE channel further comprises a second integrator coupled to the first output terminal of the second input amplifier of the second AFE channel.

34. The touch display apparatus of claim 12, wherein the first AFE channel further comprises a first input amplifier and a first current conveyor, coupled between a first output terminal of the first input amplifier of the first AFE channel and the first integrator, and scaling the first input signal of the first AFE channel with a first scale factor.

* * * * *